(12) United States Patent
Haag et al.

(10) Patent No.: US 12,544,450 B2
(45) Date of Patent: Feb. 10, 2026

(54) MEDICAL USES OF THIOL-FUNCTIONALIZED POLYGLYCEROL DERIVATIVES

(71) Applicants: FREIE UNIVERSITÄT BERLIN, Berlin (DE); CHARITE—UNIVERSITAETSMEDIZIN BERLIN, Berlin (DE)

(72) Inventors: Rainer Haag, Berlin (DE); Marcus Mall, Berlin (DE); Daniel Lauster, Berlin (DE); Yinan Zhong, Berlin (DE)

(73) Assignees: FREIE UNIVERSITÄT BERLIN, Berlin (DE); CHARITÉ - UNIVERSITÄTSMEDIZIN BERLIN, Berlin (DE)

( * ) Notice: Subject to any disclaimer, the term of this patent is extended or adjusted under 35 U.S.C. 154(b) by 974 days.

(21) Appl. No.: 17/764,179

(22) PCT Filed: Sep. 28, 2020

(86) PCT No.: PCT/EP2020/077083
§ 371 (c)(1),
(2) Date: Mar. 26, 2022

(87) PCT Pub. No.: WO2021/058818
PCT Pub. Date: Apr. 1, 2021

(65) Prior Publication Data
US 2022/0401565 A1   Dec. 22, 2022

(30) Foreign Application Priority Data
Sep. 27, 2019   (EP) ..................................... 19200288

(51) Int. Cl.
*A61K 47/60* (2017.01)
*A61P 11/12* (2006.01)
*C08G 65/48* (2006.01)

(52) U.S. Cl.
CPC .............. *A61K 47/60* (2017.08); *A61P 11/12* (2018.01); *C08G 65/48* (2013.01); *C08G 2650/30* (2013.01); *C08G 2650/54* (2013.01)

(58) Field of Classification Search
CPC ......... A61K 47/60; A61P 11/12; C07G 65/48; C07G 2650/30
See application file for complete search history.

(56) References Cited

U.S. PATENT DOCUMENTS

| | | |
|---|---|---|
| 3,567,835 A | 3/1971 | Morren et al. |
| 4,210,666 A | 7/1980 | Munson, Jr. |
| 7,345,051 B2 | 3/2008 | Zhou et al. |
| 9,346,753 B2 | 5/2016 | Johnson et al. |
| 2005/0260140 A1 | 11/2005 | White et al. |
| 2015/0307530 A1 | 10/2015 | Johnson et al. |
| 2016/0023149 A1 | 1/2016 | Schouweiler et al. |
| 2016/0060284 A1* | 3/2016 | Oscarson ................ A61P 11/00 514/23 |
| 2016/0307530 A1 | 10/2016 | Takahashi et al. |

FOREIGN PATENT DOCUMENTS

| | | |
|---|---|---|
| DE | 26 02 196 A1 | 7/1977 |
| EP | 0 045 285 A1 | 2/1982 |
| EP | 3048130 A1 | 1/2015 |
| EP | 3283549 B1 | 4/2016 |
| WO | 98/38995 A1 | 9/1998 |
| WO | 2008/015015 A2 | 2/2008 |
| WO | 2014/094041 A1 | 6/2014 |
| WO | 2014/153009 A1 | 9/2014 |
| WO | 2016/123335 A1 | 8/2016 |
| WO | 2016/149378 A1 | 9/2016 |
| WO | 2016/176423 A1 | 11/2016 |
| WO | 2019096782 A1 | 5/2019 |

OTHER PUBLICATIONS

Stoebener, Daniel David, et al. "Dynamic Protein Adsorption onto Dendritic Polyglycerol Sulfate Self-Assembled Monolayers." Langmuir 2018, 34, 10302-10308.
Yeh, Po-Ying J. et al. "Self-Assembled Monothiol-Terminated Hyperbranched Polyglycerols on a Gold Surface: A Comparative Study on the Structure, Morphology, and Protein Adsorption Characteristics with Linear Poly(ethylene glycol)s." Langmuir 2008, 24, 4907-4916.
Lee, Rees L., et al. "Thioredoxin and dihydrolipoic acid inhibit elastase activity in cystic fibrosis sputum." American Journal of Physiology-Lung Cellular and Molecular Physiology 289.5 (Nov. 1, 2005): L875-L882.
Yuan, Shaopeng, et al. "Oxidation increases mucin polymer cross-links to stiffen airway mucus gels." Science translational medicine 7.276 (Feb. 25, 2015): 276ra27-276ra27.
Tabachnik, Nina Felice, et al. "Protein binding of N-2-mercaptoethyl-1, 3-diaminopropane via mixed disulfide formation after oral administration of WR 2721." Journal of Pharmacology and Experimental Therapeutics 220.2 (Feb. 1982): 243-246.
Calderón, Marcelo, et al. "Dendritic polyglycerols for biomedical applications." Advanced Materials 22.2 (Jan. 12, 2010): 190-218.

(Continued)

*Primary Examiner* — Timothy R Rozof
(74) *Attorney, Agent, or Firm* — Maschoff Brennan

(57) ABSTRACT

It is provided a method of treatment of a human or animal patient in need thereof to achieve a reduction of the viscosity of mucus of the patient which is carried out by administering a polyglycerol derivative having a linear or dendritic polyglycerol backbone and carrying at least one thiol group covalently bound to the polyglycerol backbone. It is further provided a method of treatment of a human or animal patient suffering from chronic sinusitis, asthma, chronic bronchitis, cystic fibrosis, chronic obstructive pulmonary disease, emphysema, bronchiectasis, chronic inflammatory bowel diseases, constipation, gastrointestinal malabsorption syndrome, irritable bowel syndrome, steatorrhea or diarrhea by administering a polyglycerol derivative. Further specific thiol-functionalized polyglycerol derivatives and a corresponding manufacturing method are provided.

10 Claims, 9 Drawing Sheets

(56) References Cited

OTHER PUBLICATIONS

Gröger, Dominic, et al. "Synthesis and biological evaluation of radio and dye labeled amino functionalized dendritic polyglycerol sulfates as multivalent anti-inflammatory compounds." Bioconjugate Chemistry 24.9 (Sep. 18, 2013): 1507-1514.
Leichner, Christina, et al. "Thiolated polymers: Bioinspired polymers utilizing one of the most important bridging structures in nature." Advanced Drug Delivery Reviews 151 (Nov. 2019): 191-221.
Leitner, Verena M., et al. "Thiolated polymers: evidence for the formation of disulphide bonds with mucus glycoproteins." European Journal of Pharmaceutics and Biopharmaceutics 56.2 (Sep. 2003): 207-214.
Ehre, Camille, et al. "An improved inhaled mucolytic to treat airway muco-obstructive diseases." American Journal of Respiratory and Critical Care Medicine 199.2 (Jan. 15, 2019): 171-180.
Miller et al. "Effect of oral N-acetylcysteine on mucus clearance." British Journal of Diseases of the Chest, vol. 79 Jan. 1, 1985, pp. 262-266.

\* cited by examiner

A. dPGS-SH

B. dPG-SH

C. dPGS-LA(SH)

(I)

(a) → (b)

(II)

(b) → (c)

(III)

(c) → (d)

(IV)

(d) → (e)

MEDICAL USES OF THIOL-FUNCTIONALIZED POLYGLYCEROL DERIVATIVES

CROSS-REFERENCE TO A RELATED APPLICATION

This application is a National Phase patent Application of International Patent Application Number PCT/EP2020/077083, filed on Sep. 28, 2020, which claims priority of European Patent Application Number 19 200 288.9, filed on Sep. 27, 2019.

BACKGROUND

The disclosure relates to methods of treatment of a human or animal patient which are carried out by administering a polyglycerol derivative, to a thiol-functionalized polyglycerol derivative and to a method for manufacturing such a thiol-functionalized polyglycerol derivative.

The human mucosal surfaces (mucosa) are covered with a thin hydrobiopolymer called mucus that has important homeostatic functions and protects those surfaces from dehydration or infection. Mucus consists of highly glycosylated mucin monomers (up to 80% sugar content), which allows hydrogels to form in the presence of water. These mucin monomers in turn can form disulfide bridges by oxidation and thus multimerize.

Under physiological conditions, mucus solid matter concentrations of approximately 10 mg/ml (percentage of dry mass with respect to moist mass) are found in humans. This concentration can increase massively (up to 80 to 100 mg/ml) in some diseases such as cystic fibrosis (CF), chronic obstructive pulmonary disease (COPD) or bronchial asthma. The high mucus concentration and the formation of disulfide bridges caused by oxidation processes lead to a massive increase in viscoelastic material properties. Affected patients suffer from up to life-threatening shortness of breath, frequent infections and inflammation of the respiratory tract.

For the treatment of such obstructive pulmonary diseases, research is being carried out not only on disease-specific drugs but also on symptomatically effective mucolytic substances. The basic strategy for relieving mucus-induced shortness of breath is to decompose the mucus by reducing the disulfide bridges. N-acetylcysteine (NAC) is the only clinically approved drug with such a mode of action to date, but the effectiveness of the drug has been doubted in several independent studies (Millar, Ann B., et al. "Effect of oral N-acetylcysteine on mucus clearance." *British Journal of Diseases of the Chest* 79 (1985): 262-266.). Patients treated with hypertonic saline solution experienced similar symptom relief as patients treated with NAC.

US 2005/0260140 A1 describes mucolytic and anti-elastase compounds. These compounds contain a dithiol active-site.

U.S. Pat. No. 7,345,051 B2 describes mucin synthesis inhibitors. Thus, this US patent aims in avoiding mucin synthesis and thus teaches a different way of treating excessive mucus production.

US 2016/023149 A1 describes compositions and methods for decreasing the viscosity of excessively viscous mucus. These compositions contain an enzyme like an oxidoreductase containing a thioredoxin monocysteinic active site in a reduced state in its catalytic center. It might furthermore contain a reducing system.

DE 26 02 196 A1 describes pharmaceutical agents for human and veterinary medicine containing DL-2-amino-4-(carboxymethylthio)butyric acid having mucolytic activity and a regenerative effect on lung and bronchial tissue.

US 2015/0307530 A1 describes a method of liquefying mucus from mucosal surfaces by administering compounds containing a phosphine group.

WO 98/38995 A1 describes the use of 2-methyl-thiazolidine-2,4-dicarboxylic acid and/or its physiologically tolerable salts as mucolytic agents.

U.S. Pat. No. 4,210,666 A describes 2-Thiophenecarboxamido-alkylmercaptans with a straight or branched divalent alkylene radical of 2 to 4 carbon atoms and methods of using the compounds as mucolytic agents in combating lung mucus and compositions for use as mucolytic agents.

U.S. Pat. No. 3,567,835 A discloses salts of mercaptoalkane sulphonic acids of the general formula HS—X—SO$_3$H, wherein X is a C2-6 straight or branched chain alkylene radical. The compositions are particularly useful for treatment of diseases of the respiratory tract.

U.S. Pat. No. 9,346,753 B2 discloses dithiol mucolytic agents. These agents increase the liquefaction of mucus in a patient with excessive mucus or mucus with increased viscoelastic, cohesive, or adhesive properties. Also disclosed are a variety of methods of treatment using these mucolytic agents.

WO 2016/123335 A1 and WO 2016/176423 A1 describe mucolytic agents with an aryl-based core as well as methods of treatment which take advantage of the mucolytic properties of these agents.

Lee, Rees L., et al. "Thioredoxin and dihydrolipoic acid inhibit elastase activity in cystic fibrosis sputum." *American Journal of Physiology-Lung Cellular and Molecular Physiology* 289.5 (2005): L875-L882 examined three naturally occurring dithiol reducing systems for their effects on elastase activity.

Yuan, Shaopeng, et al. "Oxidation increases mucin polymer cross-links to stiffen airway mucus gels." *Science translational medicine* 7.276 (2015): 276ra27-276ra27 describes that that cystic fibrosis airway mucus gels have a molecular architecture characterized by a core of mucin covered by a web of DNA and a rheological profile characterized by high elasticity that can be normalized by chemical reduction. Methyl 6-thio-6-deoxy-α-d-galactopyranoside was synthesized and found to have stronger reducing activity than NAC and more potent and fast-acting mucolytic activity in cystic fibrosis sputum. This publication further suggests that pathologic mucus gel formation in the lung can be generally targeted by thiol-modified carbohydrates.

Tabachnik, Nina Felice, et al. "Protein binding of N-2-mercaptoethyl-1, 3-diaminopropane via mixed disulfide formation after oral administration of WR 2721." *Journal of Pharmacology and Experimental Therapeutics* 220.2 (1982): 243-246 describes that N-2-mercaptoethyl-1,3-diaminopropane (MDP), when incubated with whole sputum or with purified mucin solutions in vitro, decreased the viscosity of these solutions by reduction of the accessible disulfide bonds of the mucin molecule and was subsequently found in mixed disulfide association with the mucin molecule.

Calderón, Marcelo, et al. "Dendritic polyglycerols for biomedical applications." *Advanced Materials* 22.2 (2010): 190-218 describes different polyglycerol derivatives, amongst them also a thiolated polyglycerol.

Gröger, Dominic, et al. "Synthesis and biological evaluation of radio and dye labeled amino functionalized dendritic polyglycerol sulfates as multivalent anti-inflammatory compounds." *Bioconjugate Chemistry* 24.9 (2013): 1507-1514 describes amino-functionalized dendritic polyglycerol sulfates, in particular dPGS indocarbocyanine (ICC) dye conjugates.

Leichner, Christina, et al. "Thiolated polymers: Bioinspired polymers utilizing one of the most important bridging structures in nature." *Advanced Drug Delivery Reviews* 151

(2019): 191-221 is a review on thiolated polymers and also describes thiolated polyglycerol derivatives.

Leitner, Verena M., et al. "Thiolated polymers: evidence for the formation of disulphide bonds with mucus glycoproteins." *European Journal of Pharmaceutics and Biopharmaceutics* 56.2 (2003): 207-214 discusses mucoadhesive properties of thiolated polymers.

EP 0 045 285 A1 describes macromolecular compounds of mucolytic activity, constituted by carbohydrates as their basic structure, to which proteolytic enzymes and sulfhydryl groups are bonded by suitable aliphatic chains.

WO 2014/153009 A2 describes a thiosaccharide mucolytic agent useful for decreasing mucus elasticity or decreasing mucus viscosity in a subject in need thereof.

Ehre, Camille, et al. "An improved inhaled mucolytic to treat airway muco-obstructive diseases." *American Journal of Respiratory and Critical Care Medicine* 199.2 (2019): 171-180 describes mucolytic activity of a novel mucin-reducing agent, P3001, in comparison to N-acetylcystein (NAC).

SUMMARY

It is an object underlying the proposed solution to provide novel mucolytic medications as well as substances that can be used in novel medicaments that are appropriate for chemically modifying and thus destabilizing mucus, i.e. that act as mucolytic.

This object is achieved by the further medical use, in particular the therapeutic use, of a polyglycerol derivative as mucolytic. Thereby, this polyglycerol derivative comprises a linear or dendritic polyglycerol backbone and carries at least one thiol group covalently bound to the polyglycerol backbone. The thiol group can be bound directly or indirectly to the polyglycerol backbone.

Thiol-functionalized hydrophilic polyglycerols can effectively penetrate the mucus gel and break disulfide bridges. If the polyglycerols additionally carry sulfate groups, they also have anti-inflammatory properties that are helpful in curing inflammations that might be causative for an excessive mucus production or that might occur in the course of excessive mucus production.

In an embodiment, the mucolytic is a mucolytic for mucus of the respiratory tract, in particular for pulmonary mucus. In another embodiment, the mucolytic is a mucolytic for gastrointestinal mucus, in particular for intestinal mucus.

In an aspect, the solution relates to the further medical use of a polyglycerol derivative for use in treating chronic sinusitis, asthma, chronic bronchitis, cystic fibrosis, chronic obstructive pulmonary disease, emphysema, or bronchiectasis. These diseases are diseases caused by or connected to an excess mucus production in the lung and/or a higher mucus viscosity than in healthy people. The polyglycerol derivative has a linear or dendritic polyglycerol backbone and carries at least one thiol group covalently bound to the polyglycerol backbone. Also for this aspect, the thiol group can be bound directly or indirectly to the polyglycerol backbone.

In an aspect, the solution relates to the further medical use of a polyglycerol derivative for use in treating chronic inflammatory bowel diseases, constipation gastrointestinal malabsorption syndrome, irritable bowel syndrome, steatorrhea or diarrhea. These diseases are diseases caused by or connected to an excess mucus production in the gastrointestinal tract and/or a higher mucus viscosity than in healthy people. The polyglycerol derivative has a linear or dendritic polyglycerol backbone and carries at least one thiol group covalently bound to the polyglycerol backbone. Also for this aspect, the thiol group can be bound directly or indirectly to the polyglycerol backbone.

In an aspect, the solution relates to the further medical use of the same polyglycerol derivative as outlined above for use in reducing mucus viscosity.

In an aspect, the solution relates to the further medical use of the same polyglycerol derivative as outlined above for use in treating mucinous neoplasias, e.g., pseudomyxoma peritonei or mucinous adenocarcinoma.

In an embodiment of the different novel medical uses, the polyglycerol backbone carries a plurality of sulfate groups, wherein a degree of sulfation of the polyglycerol backbone is between 10 and 100%. Particularly appropriate degrees of sulfation are between 50% and 100%, between 70% and 100%, between 85% and 100%, and in particular between 90% and 100%. By sulfating the polyglycerol derivatives, anti-inflammatory properties are transferred onto the polyglycerol derivatives. Thereby, this effect is particularly pronounced if the degree of sulfation is at least 70%. The degree of sulfation indicates the relative amount of hydroxyl groups of the polyglycerol derivative that have been exchanged by sulfate groups.

In an embodiment of the different novel medical uses, the polyglycerol backbone carries 1 to 100 thiol groups per polyglycerol derivative molecule, in particular 2 to 90, in particular 3 to 80, in particular 4 to 70, in particular 5 to 60, in particular 6 to 50, in particular 7 to 40, in particular 8 to 30, in particular 9 to 20, in particular 10 to 19, in particular 11 to 18, in particular 12 to 17, in particular 13 to 16, in particular 14 to 15 thiol groups per polyglycerol derivative molecule. The thiol groups are typically statistically distributed over the whole polyglycerol derivative molecule.

Thus, after synthesizing the polyglycerol derivative, there might be some molecules carrying, e.g., 4 thiol groups, wherein other molecules might carry, e.g., only 2 thiol groups. Typically, the mucolytic effect can already be achieved with statistically one thiol group per polyglycerol derivative molecule.

In an embodiment of the different novel medical uses, the thiol-functionalization of the polyglycerol derivative is realized in form of a dithiol (i.e., two thiol groups per substituent covalently bound to the polyglycerol backbone).

In an embodiment of the different novel medical uses, the polyglycerol backbone is biodegradable. This can be achieved, e.g., by manufacturing the polyglycerol backbone by a reaction randomly combining glycerol units and ε-caprolactone units. Such a manufacturing method is disclosed, e.g., in WO 2019/096782 A1. Other biodegradable architectures of the polyglycerol backbone of the polyglycerol derivatives can also be realized.

In an embodiment of the different novel medical uses, the at least one thiol group is directly bound to the polyglycerol backbone without any intermediate linker. In another embodiment of the different novel medical uses, the at least one thiol group is indirectly bound to the polyglycerol backbone via a linker. In this regard, different linker generally possible.

In an embodiment of the different novel medical uses, the polyglycerol derivative corresponds to the following general formula (T)

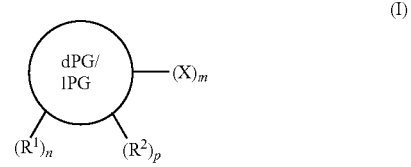

(I)

In this context,
dPG denotes a dendritic polyglycerol backbone,
lPG denotes a linear polyglycerol backbone,
X is a residue chosen from the group consisting of

| Structure | Name of polyglycerol compound |
|---|---|
|  | dPG(S)-SH<br>lPG(S)-SH |
|  | dPG(S)-mercapto carboxylic acid<br>lPG(S)-mercapto carboxylic acid |
|  | dPG(S)-triazolyl DTT<br>lPG(S)-triazolyl DTT |
|  | dPG(S)-triazolyl β-mercaptoethanol<br>lPG(S)-triazolyl β-mercaptoethanol |
|  | dPG(S)-LA(SH)<br>lPG(S)-LA(SH) |
|  | dPG(S)-triazolyl cysteamine<br>lPG(S)-triazolyl cysteamine |
|  | dPG(S)-triazolyl cysteine<br>lPG(S)-triazolyl cysteine |
|  | dPG(S)-(N)cysteine<br>lPG(S)-(N)cysteine |
|  | dPG(S)-(O)cysteine<br>lPG(S)-(O)cysteine |
|  | dPG(S)-(N)glutathion<br>lPG(S)-(N)glutathion |

| Structure | Name of polyglycerol compound |
|---|---|
| (structure with HS, glutathione-like with NH2, OH) | dPG(S)-(O)glutathion<br>lPG(S)-(O)glutathion |
| (structure with N-H, OH, R⁴) | dPG(S)-(N)thioamino acid<br>lPG(S)-(N)thioamino acid |
| (structure with O, NH2, R⁴) | dPG(S)-(O)thioamino acid<br>lPG(S)-(O)thioamino acid |
| —N(H)—R⁵ | dPG(S)-(N)peptide<br>lPG(S)-(N)peptide |
| —O—C(O)—R⁵ | dPG(S)-(O)peptide<br>lPG(S)-(O)peptide |
| —SH | dPG(S)-SH (linker-free)<br>lPG(S)-SH (linker-free) |

A is a single-charge anionic counter ion, $R^1$, $R^2$ are independently from each other —OH or —OSO$_3^-$ K$^+$, $R^3$ is H or a peptide residue having 1 to 20, in particular 2 to 19, in particular 3 to 18, in particular 4 to 17, in particular 5 to 16, in particular 6 to 15, in particular 7 to 14, in particular 8 to 13, in particular 9 to 12, in particular 10 or 11 amino acid residues, $R^4$ is a C1-C$_{10}$ hydrocarbon chain being optionally interrupted by N, S, and/or O and being at least substituted in such a way to carry at least one thiol group (further substituents are optionally possible), $R^5$ is a peptidyl comprising 1 to 20 amino acid residues, wherein at least one amino acid residue is a cysteine residue, K is a single-charge cationic counter ion, m is 1, 2, 3, 4, 5, 6, 7, 8, 9, 10, 11, 12, 13, 14, 15, 16, 17, 18, 19, or 20 n is an integer between 5 and 5000, o is 1, 2, 3, 4, 5, 6, 7, 8, 9, 10, 11, 12, 13, 14, 15, 16, and p is an integer between 0 and 5000.

In an embodiment, the cationic counter ion is an ion of an alkali metal, in particular a sodium ion (Na$^+$) or a potassium ion (K$^+$).

In an embodiment, n is an integer between 10 and 4000, in particular between 15 and 3500, in particular between 20 and 3000, in particular between 50 and 2500, in particular between 100 and 2000, in particular between 200 and 1500, in particular between 500 and 1000.

In an embodiment, p is an integer between 10 and 4000, in particular between 15 and 3500, in particular between 20 and 3000, in particular between 50 and 2500, in particular between 100 and 2000, in particular between 200 and 1500, in particular between 500 and 1000.

In an embodiment, $R^5$ comprises 2 to 19, in particular 3 to 18, in particular 4 to 17, in particular 5 to 16, in particular 6 to 15, in particular 7 to 14, in particular 8 to 13, in particular 9 to 12, in particular 10 or 11 amino acid residues, wherein at least one amino acid residue is a cysteine residue. In an embodiment, the amino acid residues of residue $R^5$ are chosen from the group of standard amino acid residues.

In an aspect, the solution does not only relate to novel medical uses of polyglycerol derivatives, but to these polyglycerol derivatives themselves. In this aspect, the solution relates to a polyglycerol derivative corresponding to the following general formula (I):

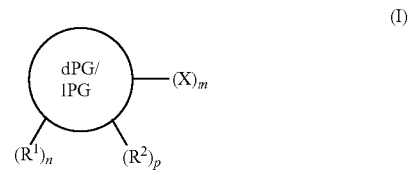

(I)

In this context, dPG denotes a dendritic polyglycerol backbone, lPG denotes a linear polyglycerol backbone, X is a residue chosen from the group consisting of:

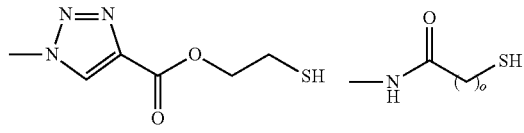

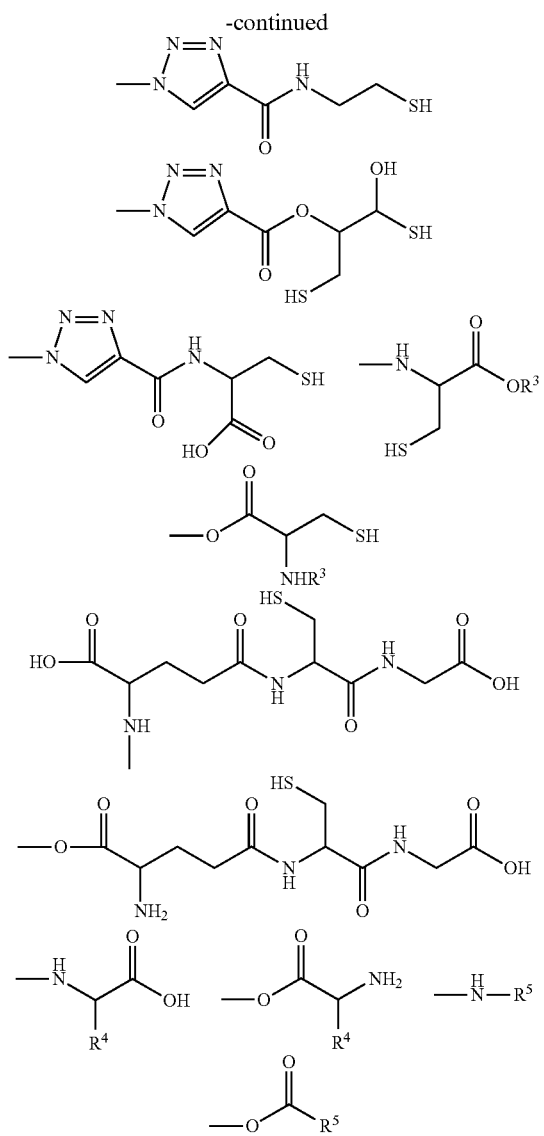

$R^1$, $R^2$ are independently from each other —OH or —OSO$_3^-$ K$^+$,
$R^3$ is H or a peptide residue having 1 to 20, in particular 2 to 19, in particular 3 to 18, in particular 4 to 17, in particular 5 to 16, in particular 6 to 15, in particular 7 to 14, in particular 8 to 13, in particular 9 to 12, in particular 10 or 11 amino acid residues,
$R^4$ is a $C_1$-$C_{10}$ hydrocarbon chain being optionally interrupted by N, S, and/or O and being at least substituted in such a way to carry at least one thiol group (further substituents are optionally possible),
$R^5$ is a peptidyl comprising 1 to 20 amino acid residues, wherein at least one amino acid residue is a cysteine residue,
K is a single-charge cationic counter ion,
m is 1, 2, 3, 4, 5, 6, 7, 8, 9, 10, 11, 12, 13, 14, 15, 16, 17, 18, 19, or 20
n is an integer between 5 and 5000,
o is 1, 2, 3, 4, 5, 6, 7, 8, 9, 10, 11, 12, 13, 14, 15, 16, and
p is an integer between 0 and 5000.

In an embodiment, the cationic counter ion is an ion of an alkali metal, in particular a sodium ion (Na$^+$) or a potassium ion (K$^+$).

In an embodiment, the polyglycerol derivative comprises a linear polyglycerol backbone. In an embodiment, the whole polyglycerol backbone of the polyglycerol derivative is linear. The polyglycerol derivative can be denoted as linear polyglycerol derivative (lPG) in these embodiments. In this context, a 1,2-linkage and/or a 1,3-linkage can be established between the individual glycerol units of the polyglycerol derivative.

In an embodiment, the polyglycerol derivative comprises a dendritic polyglycerol backbone. In an embodiment, the whole polyglycerol backbone of the polyglycerol derivative is dendritic. The dendritic backbone of the polyglycerol derivative can also be denoted as hyperbranched backbone. Thus, in these embodiments, the polyglycerol derivative can be denoted as dendritic polyglycerol (dPG) or hyperbranched polyglycerol (hPG). In case of sulfate groups as substituents, the polyglycerol can be denoted as dendritic polyglycerol sulfate (dPGS) or hyperbranched polyglycerol sulfate (hPGS). Hyperbranched polyglycerol sulfates express little or no anticoagulant effect.

In an embodiment, the residue X is:

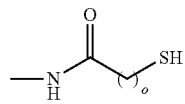

In an embodiment, the residue X is:

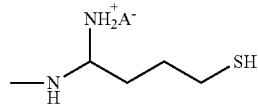

In an embodiment, the residue X is:

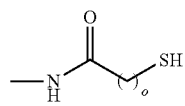

In an embodiment, in particular in the embodiment according to the preceding paragraph, o is 1.

In an embodiment, the residue X is:

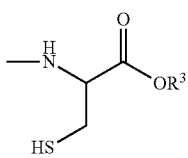

In an embodiment, the residue X is:

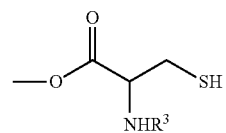

In an embodiment, the residue X is:

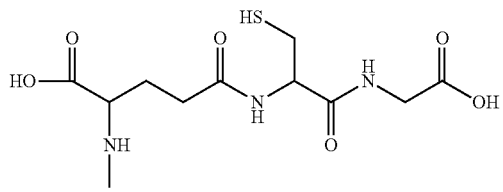 [SMILES: CNC(CCC(=O)NC(CS)C(=O)NCC(=O)O)C(=O)O]

In an embodiment, the residue X is:

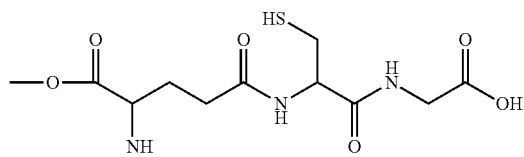 [SMILES: COC(=O)C(N)CCC(=O)NC(CS)C(=O)NCC(=O)O]

In an embodiment, the residue X is:

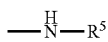

In an embodiment, the residue X is:

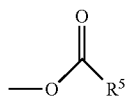

Herewith disclosed is a first method for manufacturing a polyglycerol derivative according to the preceding explanations. This method is carried out by performing the steps explained in the following.

In a first step, an aqueous solution of 2-iminothiolane hydrochloride is added to an aqueous solution of an amine-functionalized polyglycerol derivative corresponding to the following general formula (II):

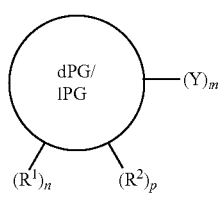

(II)

In this context,
dPG denotes a dendritic polyglycerol backbone,
lPG denotes a linear polyglycerol backbone,
Y is —$NH_2$,
$R^1$, $R^2$ are independently from each other —OH or —$OSO_3^-$ $K^+$,
K is a single-charge cationic counter ion,
m is 1, 2, 3, 4, 5, 6, 7, 8, 9, 10, 11, 12, 13, 14, 15, 16, 17, 18, 19, or 20
n is an integer between 5 and 5000, and
p is an integer between 0 and 5000.

In a second step, both compounds are let react to obtain a thiol-functionalized polyglycerol derivative corresponding to the following general formula (I)

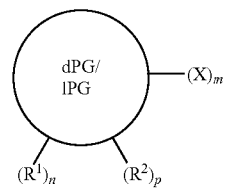

(I)

wherein X is

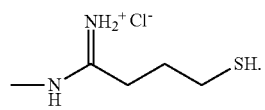

The residues in formula (I) have the meanings explained above.

This reaction can take place, e.g., at a temperature between 0° C. and 50° C., such as room temperature. An appropriate reaction duration is 10 minutes to 24 hours, in particular 20 minutes to 20 hours, in particular 30 minutes to 15 hours, in particular 40 minutes to 12 hours, in particular 50 minutes to 10 hours, in particular 1 hour to 8 hours, in particular 2 hours to 6 hours, in particular 3 hours to 4 hours. A particularly appropriate reaction duration lies between 30 minutes and 90 minutes, i.e., around 1 hour.

In an aspect, the solution relates to a second method for manufacturing a polyglycerol derivative according to the preceding explanations. This method is carried out by performing the steps explained in the following.

In a first step, a solution of mercaptoacetic acid and an activation reagent such as 1-(3-dimethylaminopropyl)-3-ethylcarbodiimide hydrochloride (EDCl) in water or a polar aprotic solvent is added to a solution of an amine-functionalized polyglycerol derivative corresponding to the following general formula (II) in water or a polar aprotic solvent:

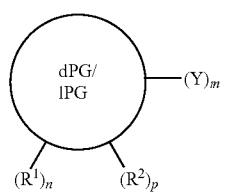

(II)

In this context,
dPG denotes a dendritic polyglycerol backbone,
lPG denotes a linear polyglycerol backbone,
Y is —$NH_2$,
$R^1$, $R^2$ are independently from each other —OH or —$OSO_3^-$ $K^+$,
K is a single-charge cationic counter ion,
m is 1, 2, 3, 4, 5, 6, 7, 8, 9, 10, 11, 12, 13, 14, 15, 16, 17, 18, 19, or 20
n is an integer between 5 and 5000,
p is an integer between 0 and 5000.

An appropriate polar aprotic solvent is, e.g., dimethyl sulfoxide (DMSO).

In a second step, all compounds are let react together. Afterwards, the solvent is removed to obtain a thiol-functionalized polyglycerol derivative corresponding to the following general formula (I):

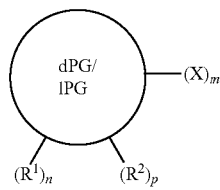

(I)

wherein X is

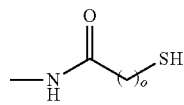

wherein o is 1.

The residues in formula (I) have the meanings explained above.

This reaction can take place, e.g., at a temperature ranging from 20° C. to 80° C., in particular 25° C. to 70° C., in particular 30° C. to 60° C., in particular 40° C. to 50° C. In an embodiment, the reaction takes first place at a higher temperature, e.g., a temperature in a range of 40° C. to 80° C., in particular 50° C. to 75° C., in particular 60° C. to 70° C., and then at a lower temperature, e.g., a temperature lying in a range of 20° C. to 40° C., in particular 25° C. to 30° C. To give a specific example, the reaction might be carried out such that it is performed at 50° C. in a first step and at room temperature in a second step.

An appropriate total reaction duration is 10 minutes to 48 hours, in particular 20 minutes to 36 hours, in particular 30 minutes to 24 hours, in particular 40 minutes to 20 hours, in particular 50 minutes to 12 hours, in particular 1 hour to 10 hours, in particular 2 hours to 8 hours, in particular 3 hours to 6 hours, in particular 4 hours to 5 hours.

A particularly appropriate duration for the first reaction step is 10 minutes to five hours, in particular 20 minutes to 4 hours, in particular 30 minutes to 2 hours, in particular 40 minutes to 1.5 hours, in particular 50 minutes to 1 hour.

A particularly appropriate duration for the second reaction step is 1 hour to 48 hours, in particular 5 hours to 36 hours, in particular 10 hours to 30 hours, in particular 15 hours to 26 hours, in particular 20 hours to 24 hours.

To give a specific example, the reaction might be carried out such that it is performed during 4 hours (e.g., at 50° C.) in a first step and during 24 hours (e.g., at room temperature) in a second step.

In an embodiment, the amine-functionalized polyglycerol derivative and the thiol-functionalized polyglycerol derivative are linear polyglycerol derivatives.

In an embodiment, the amine-functionalized polyglycerol derivative and the thiol-functionalized polyglycerol derivative are dendritic polyglycerol derivatives.

In an aspect, the solution relates to a method of treatment of a human or animal patient in need thereof to achieve a reduction of the viscosity of mucus of the patient. This method is carried out by administering a polyglycerol derivative having a linear or dendritic polyglycerol backbone and carrying at least one thiol group covalently bound to the polyglycerol backbone to the patient. Thus, this method aims in reducing the amount of mucus in or on an organ of the patient by enabling an easier decomposition and discharge of the mucus.

In an aspect, the solution relates to a method of treatment of a human or animal patient suffering from chronic sinusitis, asthma, chronic bronchitis, cystic fibrosis, chronic obstructive pulmonary disease, emphysema, or bronchiectasis and being in need of such treatment by administering a polyglycerol derivative having a linear or dendritic polyglycerol backbone and carrying at least one thiol group covalently bound to the polyglycerol backbone to the patient.

In an aspect, the solution relates to a method of treatment of a human or animal patient suffering from chronic inflammatory bowel diseases, constipation, gastrointestinal malabsorption syndrome, irritable bowel syndrome, steatorrhea or diarrhea and being in need of such treatment by administering a polyglycerol derivative having a linear or dendritic polyglycerol backbone and carrying at least one thiol group covalently bound to the polyglycerol backbone to the patient.

All embodiments explained with respect to the different novel medical uses of the polyglycerol derivatives can be combined in any desired manner and can be transferred to the respective other uses. Furthermore, these embodiments can be transferred in any desired combination to the described polyglycerol derivatives themselves and to the described methods. Likewise, the embodiments of the polyglycerol derivatives can be combined in any desired manner and can be transferred to the described uses and to the described methods. Additionally, the embodiments of the described methods can be combined in any desired manner and can be transferred to the other methods, to the described uses and to the polyglycerol derivatives.

BRIEF DESCRIPTION OF THE DRAWINGS

Further details of aspects of the solution will be explained with respect to exemplary embodiments and accompanying Figures.

FIG. 10 B shows the thiol concentration of two batches of dPGS-SH after synthesis, and after a 10-month storage as lyophilisate at 4° C.

FIG. 10 C shows a Western blot of mucus samples from bronchoalveolar lavage (BAL) of βENaC-Tg mice subjected to increasing concentrations of dithiothreitol (DTT), N-acetylcysteine (NAC) and dPGS-SH (0.2-20 mM).

FIG. 10 D shows the elastic moduli determined by macrorheology on unprocessed mucus from healthy persons or CF patients from a shear strain sweep (φ=1 Hz).

DETAILED DESCRIPTION

Synthesis of dPGS-SH

Figure 1:
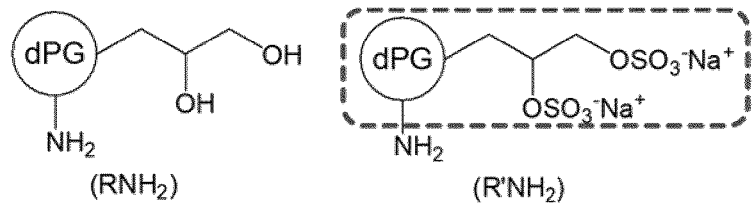
FIG. 1 shows synthetic routes for manufacturing different thiol-containing polymers.
Figure 1:
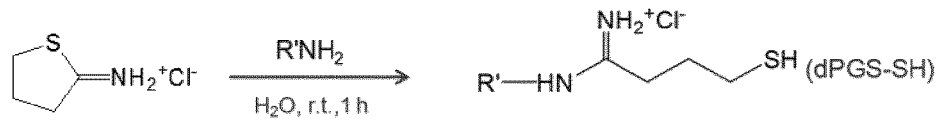
Figure 1:
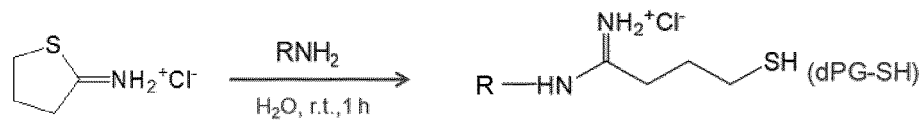
Figure 1:
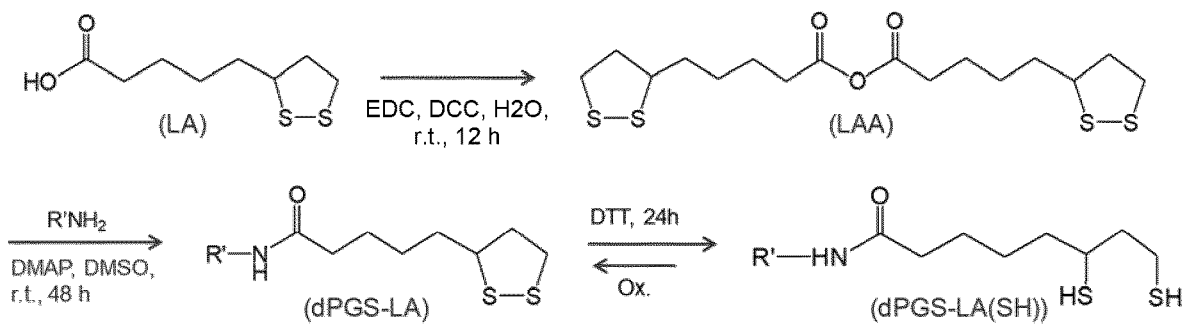

Dendritic polyglycerol sulfate-thiol (dPGS-SH) was obtained via the reaction between dPGS-amine (dPGS-NH$_2$, 38.5 kDa, sulfate: 81.7 mol. %, amine: 10.7 mol. %) and 2-iminothiolane hydrochloride (Sigma, 98%) (FIG. 1, reaction scheme A). In general, to a stirred solution of dPGS-NH$_2$ (1.0 g, 20 mL) in degassed Milli Q water, a solution of 2-iminothiolane hydrochloride (112 mg in 3 mL of the same solvent system, 1.2 eq.) was added. The reaction continued at room temperature (r.t.) for 1 h with a pH of 7.0 by adding KOH solution. Afterwards, the target polymer dPGS-SH was purified via ultrafiltration, and obtained as light yellow powder after lyophilization. The yield was 87%.

Figure 2A:
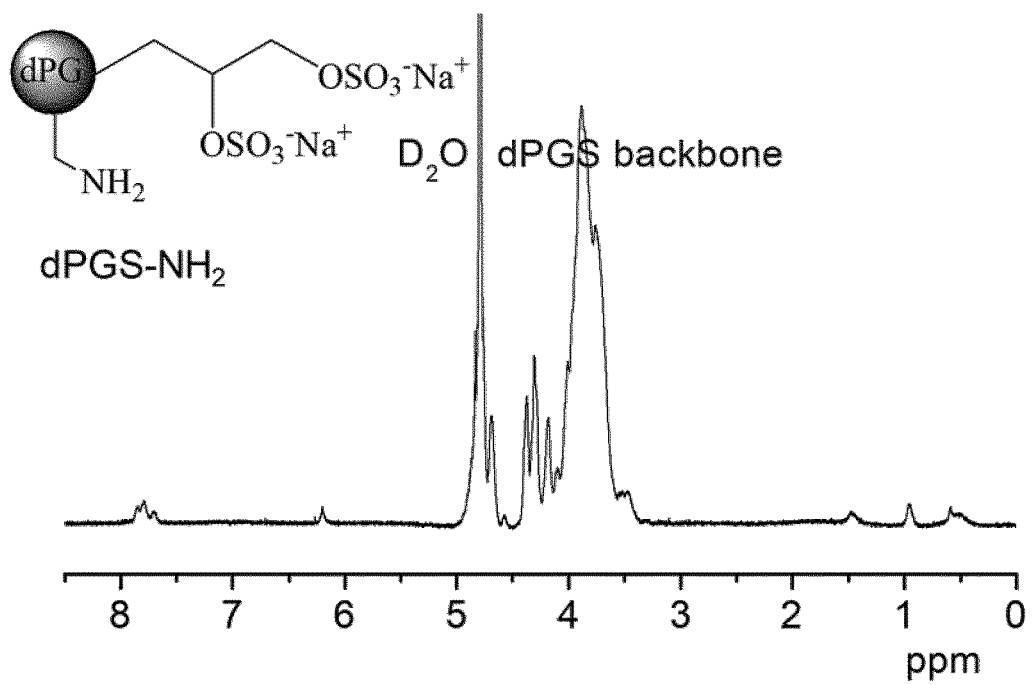
FIG. 2A shows a $^1$H NMR spectrum (600 MHz, D$_2$O) of dPGS-NH$_2$.
Figure 2B:
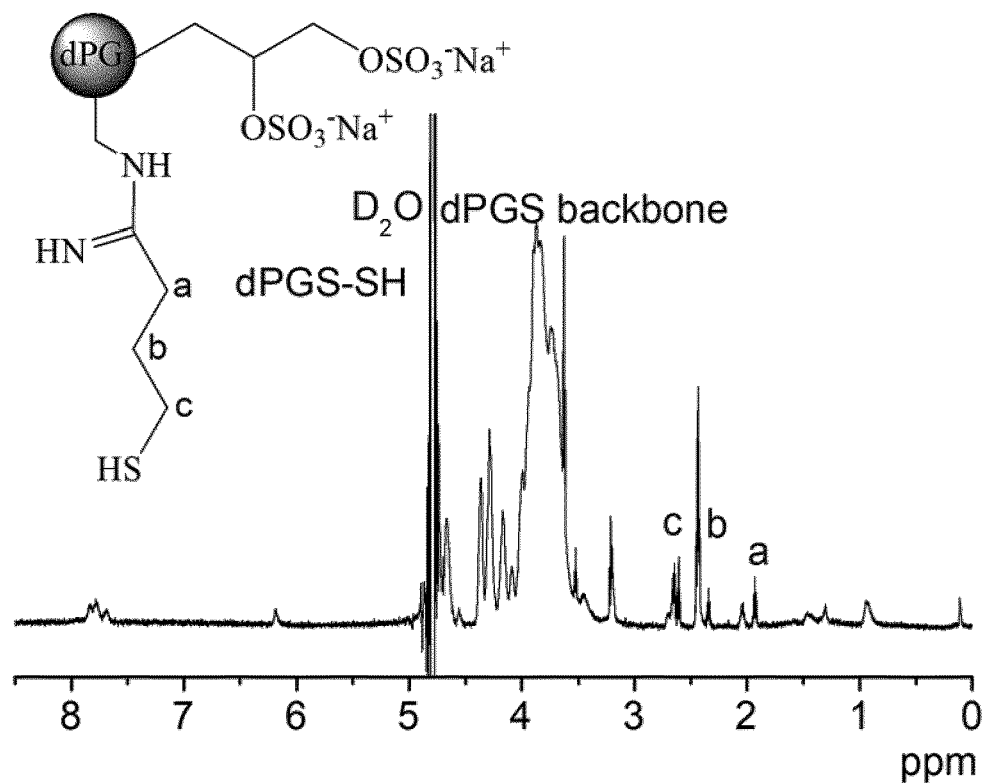
FIG. 2B shows a $^1$H NMR spectrum (600 MHz, D$_2$O) of dPGS-SH.

The characterization of dPGS-SH was evaluated by $^1$H NMR and Ellman's test. From FIG. 2 (compare the differences between FIG. 2A and FIG. 2B), besides the peaks of dPGS backbone, the appearance of δ 2.04, 2.41, and 2.61 indicated the successful formation of dPGS-SH. $^1$H NMR (600 MHz, D$_2$O): δ 3.19-4.34, 4.56-4.74 (dPGS); δ 2.04, 2.41, and 2.61 (2-iminothiolane).

Figure 3:
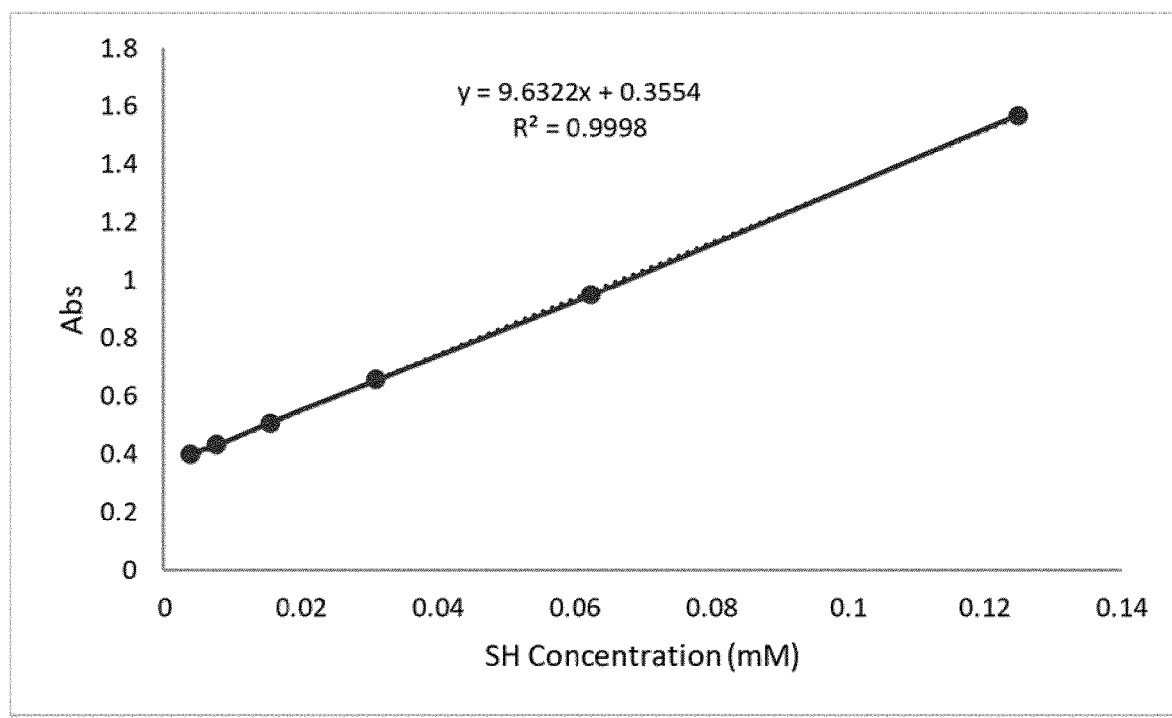
FIG. 3 shows a calibration curve of 3-mercaptopropionic acid solution.

To quantitate the thiol content of the polymers, an Ellman's test was performed. According to the calibration curve from a series of 3-mercaptopropionic acid solution in PBS (ranging from 0.0039 to 0.125 mM), an equation Y=9.6322X+0.3554 was obtained (FIG. 3), giving a thiol content of about 1.57 mol. % for dPGS-SH.

Synthesis of dPG-SH

Dendritic polyglycerol-thiol (dPG-SH) was obtained via the reaction between dPG-amine (dPG-NH$_2$, 10.0 kDa, amine: 10.0 mol %) and 2-iminothiolane hydrochloride (Sigma, 98%) (FIG. 1, reaction scheme B). In general, to a stirred solution of dPG-NH$_2$ (0.5 g, 8 mL) in degassed Milli Q water, a solution of 2-iminothiolane hydrochloride (42 mg in 2 mL of the same solvent system, 1.2 eq.) was added. The reaction continued at r.t. for 1 h with a pH of 7.0 by adding KOH solution. Afterwards, the target polymer dPG-SH was purified via ultrafiltration, and obtained as light yellow oil after lyophilization. The yield was 85%.

Figure 4A:
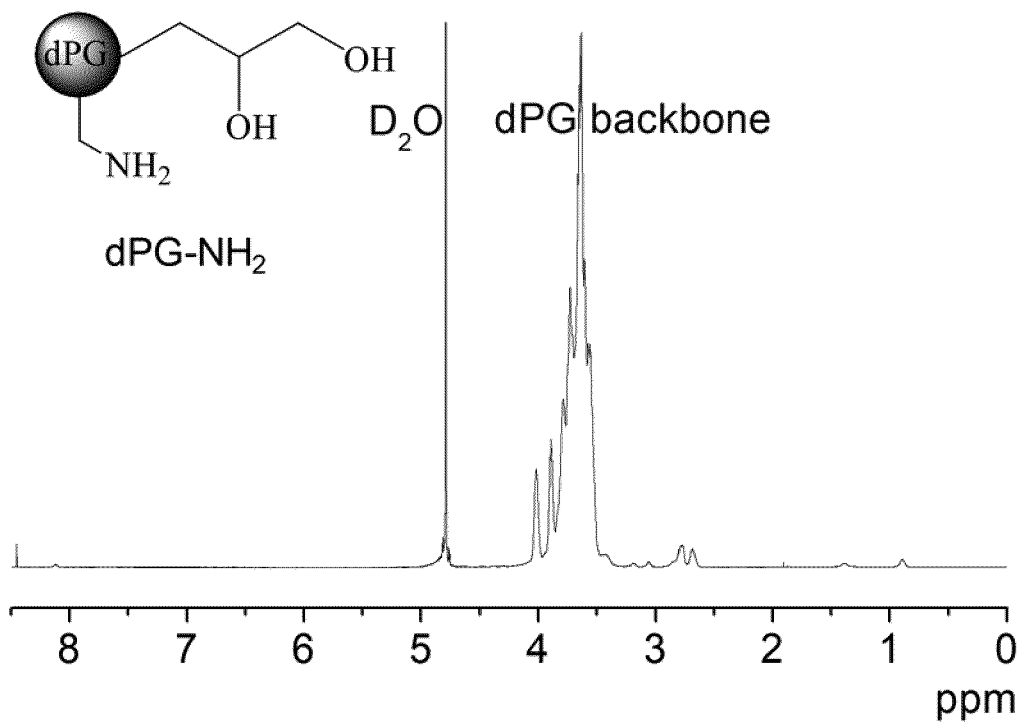
FIG. 4A shows a $^1$H NMR spectrum (600 MHz, D$_2$O) of dPG-NH$_2$.
Figure 4B:
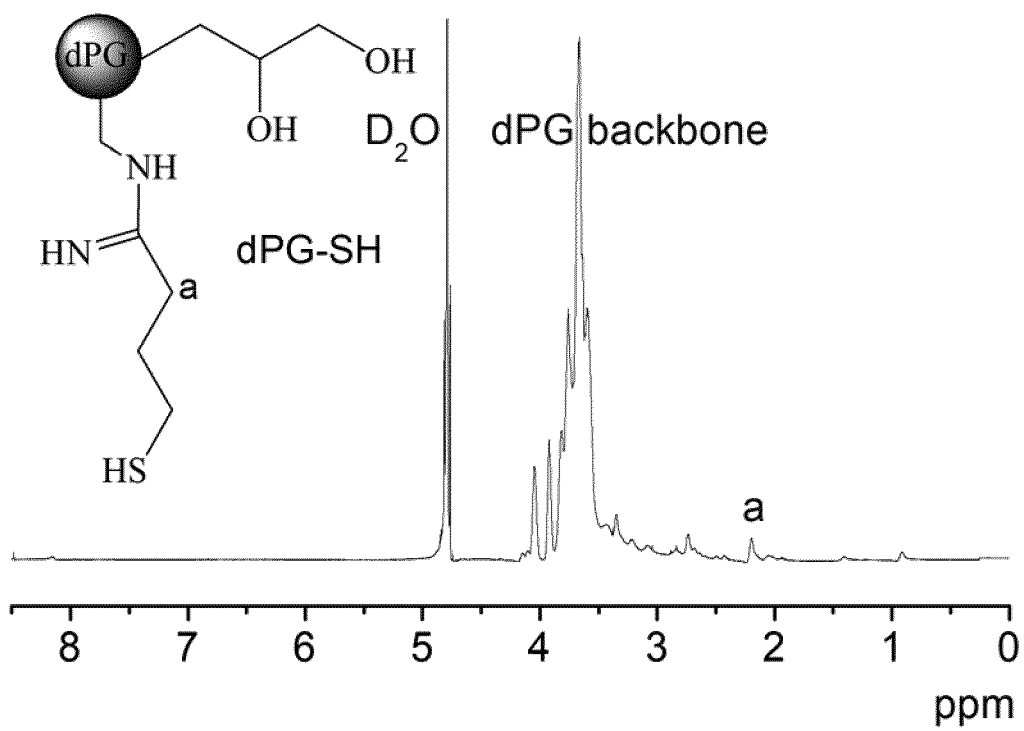
FIG. 4B shows a $^1$H NMR spectrum (600 MHz, D$_2$O) of dPG-SH.

The characterization of dPG-SH was evaluated by $^1$H NMR and Ellman's test. From FIG. 4 (compare the differences between FIG. 4A and FIG. 4B), besides the peaks of dPG backbone, the appearance of δ 2.19 indicated the successful formation of dPG-SH. $^1$H NMR (600 MHz, D$_2$O): δ 2.69, 2.77, 3.05-4.01 (dPG); δ 2.19 (methylene proton next to imine).

To quantitate the thiol content of the polymers, we also performed Ellman's test. According to the calibration curve from a series of 3-mercaptopropionic acid solution in PBS (ranging from 0.0039 to 0.125 mM), the equation Y=10.411X+0.3504 was obtained, giving a thiol content of about 0.53 mol. % for dPG-SH.

Synthesis of dPGS-LA(SH)

Figure 5:
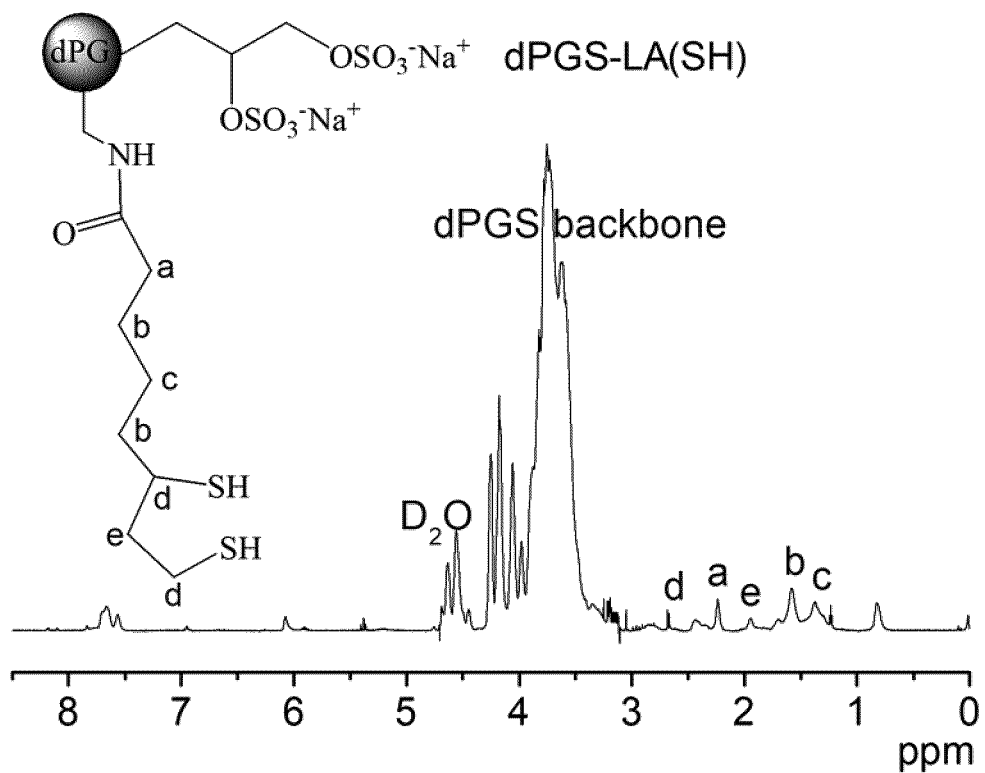
FIG. 5 shows a $^1$H NMR spectrum (600 MHz, D$_2$O) of dPGS-LA(SH).

The dithiol-containing dPGS was obtained in the following three steps (FIG. 1, reaction scheme IC): i) the formation of lipoic acid anhydride (LAA) at the presence of dicyclohexylcarbodiimid (DCC), ii) the reaction between LAA and dPGS-NH$_2$ via the catalysis of N,N-4-dimethylaminopyridine (DMAP), and iii) the breakage of the disulfide bond in LA at the presence of dithiothreitol (DTT). Firstly, under an argon atmosphere, to a stirred aqueous solution of lipoic acid (219 mg) and 1-(3-dimethylaminopropyl)-3-ethylcarbodiimide hydrochloride (EDCl), a solution of DCC (138 mg, 1.1 eq.) in 6 mL water was dropwisely added. The reaction was allowed to proceed under stirring for 12 h at r.t. in the dark. The precipitate generated during the reaction was removed by filtration, and the filtrate was concentrated via rotary evaporation to give LAA. The obtained LAA was then dissolved in 5 mL DMSO, and added into the solution of dPGS-NH$_2$ (0.6216 g) in 10 mL DMSO at the presence of DMAP (120 mg). The reaction proceeded under stirring for 48 h at room temperature in the dark. Finally, DTT (246 mg) was added into the resulting solution and reacted for 24 h under stirring at r.t. The target polymer dPGS-LA(SH) was purified via dialysis in degassed deionized water under an argon atmosphere for 48 h, and freeze-dried. The yield was 74%. $^1$H NMR (600 MHz, D$_2$O): δ 1.35, 1.58, 1.94, 2.23-2.43, 2.67 (LA); δ 3.19-4.26, 4.44-4.64 (dPGS) (FIG. 5).

Synthesis of dPGS-LA(SH) with Lower Conjugation

Firstly, under an argon atmosphere, to a stirred solution of lipoic acid (110 mg) and EDCl in 3 mL water, a solution of DCC (69 mg, 1.1 eq.) in 3 mL water was dropwisely added. The reaction was allowed to proceed under stirring for 12 h at r.t. in the dark. The precipitate generated during the reaction was removed by filtration, and the filtrate was concentrated via rotary evaporation to give LAA. The obtained LAA was then dissolved in 5 mL DMSO, and added into the solution of dPGS-NH$_2$ (0.6216 g) in 10 mL DMSO at the presence of DMAP (60 mg). The reaction proceeded under stirring for 48 h at room temperature in the dark. Finally, DTT (123 mg) was added into the resulting solution and reacted for 24 h under stirring at r.t. The target polymer dPGS-LA(SH) was purified via dialysis in degassed deionized water under an argon atmosphere for 48 h, and freeze-dried.

It is apparent that all reactions according to the reaction schemes A, B, and C of FIG. 1 could likewise be performed in the same manner with a linear polyglycerol or a linear polyglycerol sulfate.

Stability of dPGS-SH

The stability of the manufactured dPGS-SH was tested by determining its thiol content immediately after manufacturing the compound and once again after a plurality of months (6 months or 10 months, respectively). According to the results depicted in Table 1, no significant difference between the individual measurements of the same sample could be observed. Thus, the thiol group remains stable in dPGS-SH even after a prolonged storage.

TABLE 1

Stability of dPGS-SH on the basis of thiol content at different time points.

| Samples | Thiol Content (mol. %) | | |
|---|---|---|---|
| | Theoretic maximum | Determined | Determined (Apr. 17, 2019) |
| dPGS-SH (Jun. 4, 2018) | 10 | 1.31 | 1.30 |
| dPGS-SH (Oct. 12, 2018) | 10 | 1.57 | 1.57 |

Further Thiol-Containing dPG/lPG/dPGS/lPGS

There are a series of other thiol-functionalized alternatives of the previously described dPGS-SH like dPG(S)-mercapto carboxylic acid, dPG(S)-DTT, dPG(S)-β-mercaptoethanol, dPG(S)-cysteamine and dPG(S)-cysteine to name only a few.

For synthesis of dPGS-mercaptoacetic acid (a specific example of dPG(S)-mercapto carboxylic acid), the conjugation is conducted by adding a solution of mercaptoacetic acid (35 mg, 4.5 eq.) and EDCl (94.7 mg, 5.9 eq.) in DMSO (15 mL) to a solution of dPGS-amine (1 g, 0.084 mmol) in DMSO (5 mL). The mixture is then stirred at 50° C. for 4 h and at r.t. for 24 h. In the end, the solvent will be evaporated under reduced pressure, and the raw product is dissolved in degassed Milli Q water, dialyzed against the same media for three days, and lyophilized to remove water.

Figure 6:
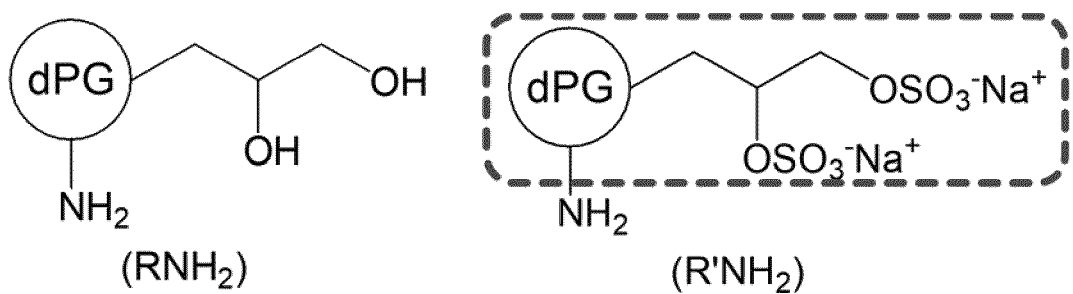
FIG. 6 shows a synthetic route for manufacturing dPGS-mercaptoacetic acid.
Figure 6:
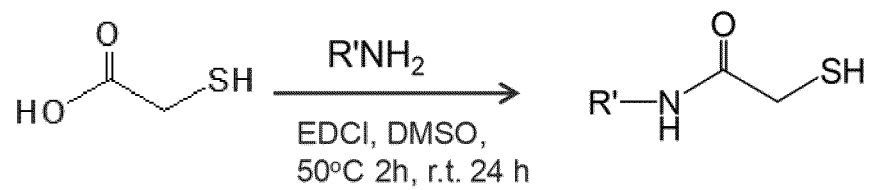

The reaction scheme is depicted in FIG. 6. It is apparent that the synthesis of dPG-mercaptoacetic acid can be achieved in the same manner as the synthesis of dPGS-mercaptoacetic acid. The reaction could likewise be performed in the same manner with a linear polyglycerol or a linear polyglycerol sulfate.

Biomechanical Studies on Mucus Using Macrorheology

In order to determine the mucolytic potential of thiol-functionalized polyglycerol derivatives the rheological properties of lung mucus, which was collected from patients with cystic fibrosis, were determined before and after treatment with different reducing or control agents. In addition, mucus from a healthy donor was used as control. Rheological measurements can be generally used to determine both elastic and viscous material components.

Clinical samples were obtained freshly from cystic fibrosis (CF) patients at Charité Berlin and put directly on ice after collection. Then, the samples were mixed with a protease inhibitor cocktail (Roche) and aliquoted in 150 µl portions. The samples were then treated with different concentrations of freshly prepared reducing agents for 30 min at 37° C. Control samples were kept on ice throughout the incubation time or treated with phosphate-buffered saline (PBS) and incubated for 30 min at 37° C. After the incubation time all samples were kept on ice until use for the macrorheological studies. Here, a Kinexus instrument (Malvern) with a cone-and-plate setup was used. The cone geometry was 20 mm diameter and a 1° C. angle. Each sample was run with an amplitude sweep mode at an oscillatory frequency of 1 Hz to determine the linear viscoelastic regime. In order to obtain viscosity parameters, measurements were repeated at 2% stain in a frequency sweep mode.

Figure 7:
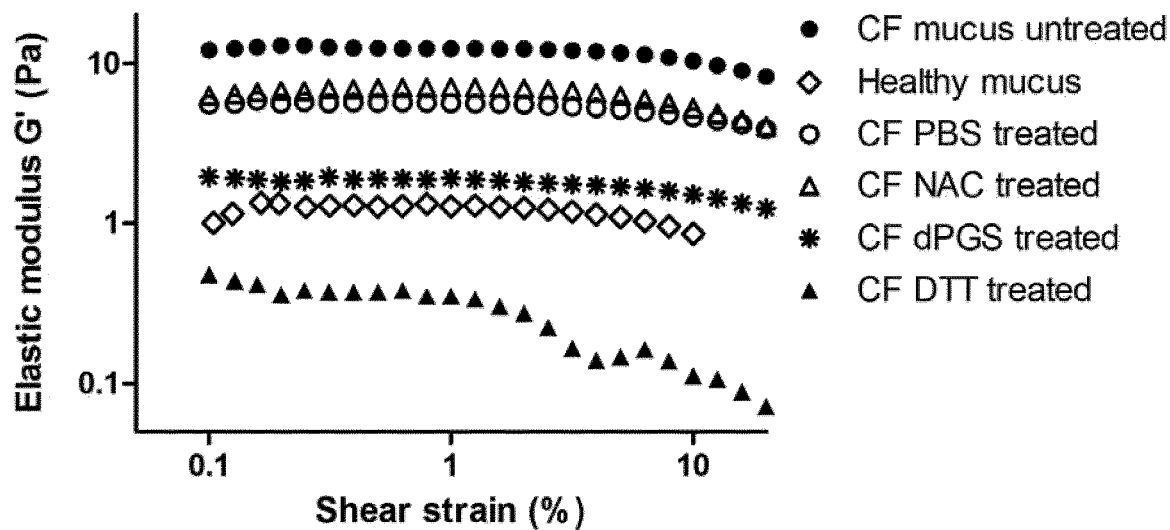
FIG. 7 shows the influence of a treatment of cystic fibrosis mucus with different mucolytics on the elastic modulus of the mucus.

The results are shown in FIG. 7. Dominant elastic components were found for both biomaterials from the elastic modulus for (G'). A treatment of CF mucus with N-acetylcysteine (NAC) showed a comparably slight reduction of the elastic modulus like a treatment with physiological phosphate buffer (PBS).

A treatment of CF mucus with thiol-functionalized dendritic polyglycerol sulfate (here referred to as dPGS, corresponding to dPGS-SH according to reaction scheme A of FIG. 1 and the corresponding explanations above) reduced the elastic modulus of CF mucus almost to the level of untreated, healthy mucus.

Dithiothreitol (DTT) was used as a positive control. It is also referred to as sputolysin and is used in order to further prepare mucus samples for analytical purposes. Due to its high toxicity, however, it is not suitable for clinical use. Even if it was not toxic, it appears to reduce almost all disulfide bonds of the mucus and thus reduces the viscosity of CF mucus to level significantly below the viscosity level of mucus from healthy individuals. Thus, DTT destroys the natural functionality of mucus which is, in contrast, preserved after a treatment with dPGS-SH.

Figure 8:
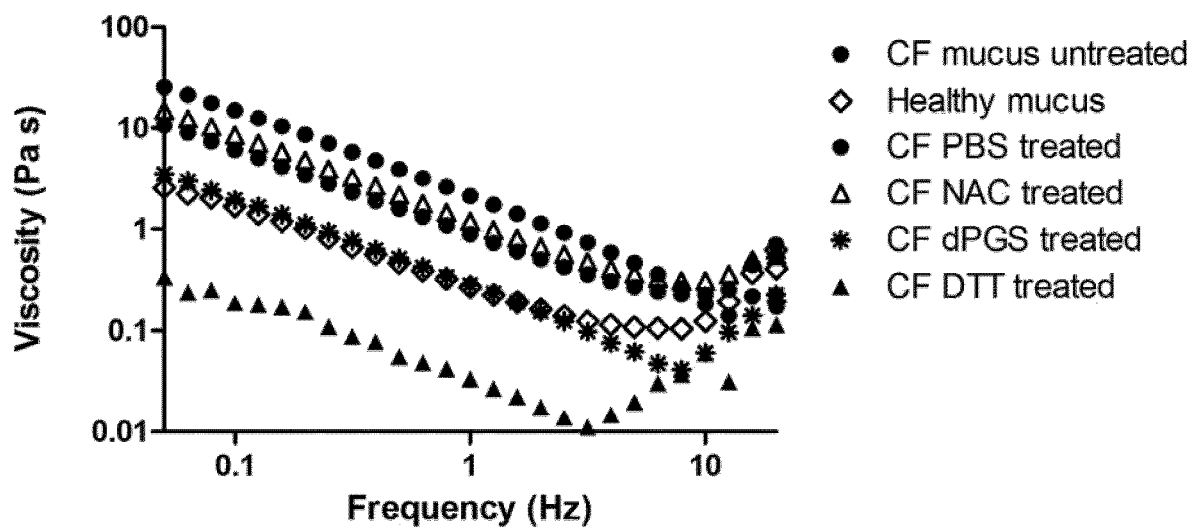
FIG. 8 shows the influence of a treatment of cystic fibrosis mucus with different mucolytics on the viscosity of the mucus.

FIG. 8 shows a depiction of the viscosity over the frequency and confirms the results explained with respect to FIG. 7. Briefly, treatment of CF mucus with dPGS-SH results in a mucus viscosity that corresponds to the mucus viscosity of healthy mucus. In contrast, NAC does not show any enhanced mucolytic activity than PBS. Furthermore, DTT completely destroys the viscosity properties of mucus and thus impairs the physiologic functionality of mucus.

Synthesis of lPG-Dithiol Via Mesylation

Figure 9:
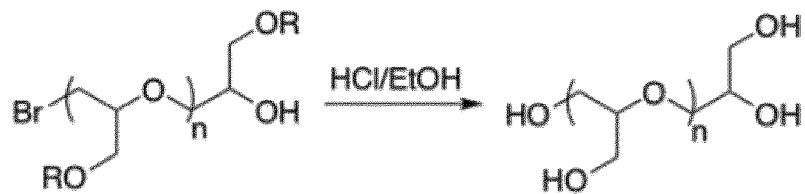
FIG. 9 shows a reaction scheme of the synthesis of lPG-dithiol via mesylation.
Figure 9:
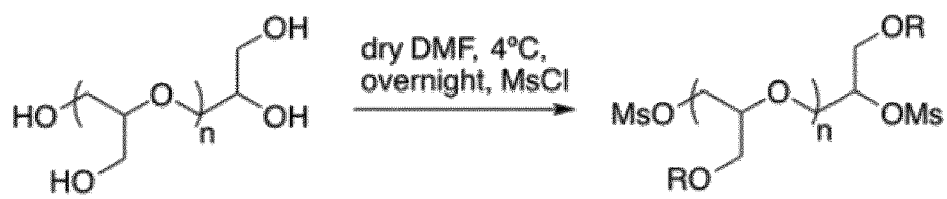
Figure 9:
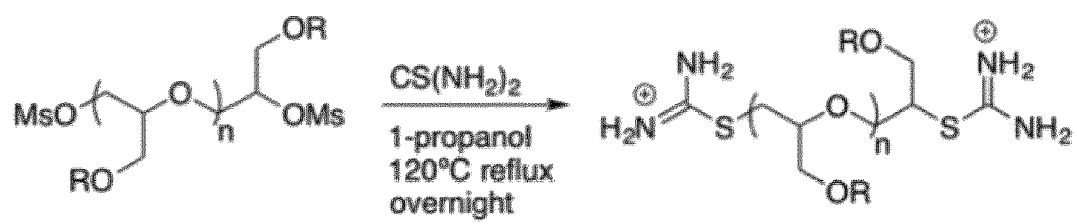
Figure 9:
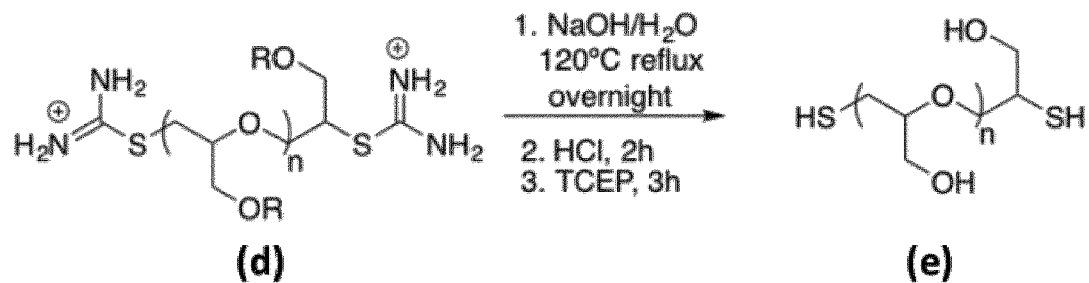
Figure 10A:
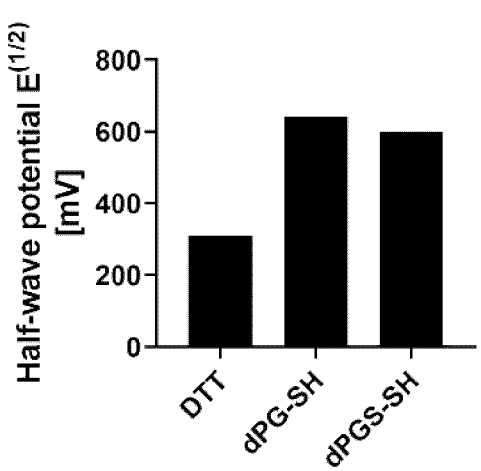
FIG. 10 A shows half-wave potential of DTT and thiol-containing polyglycerols from cyclic voltammetry measurements.
Figure 10B:
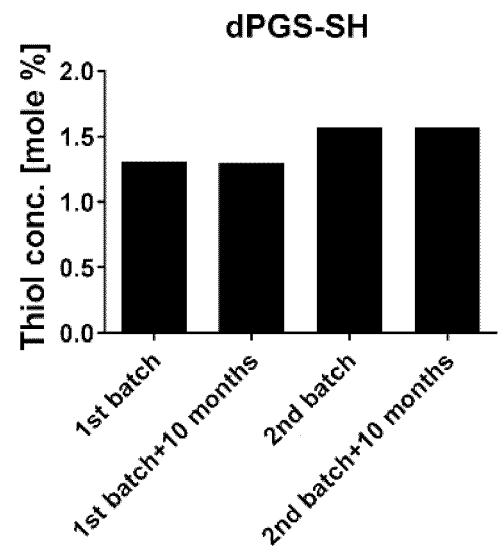
Figure 10C:
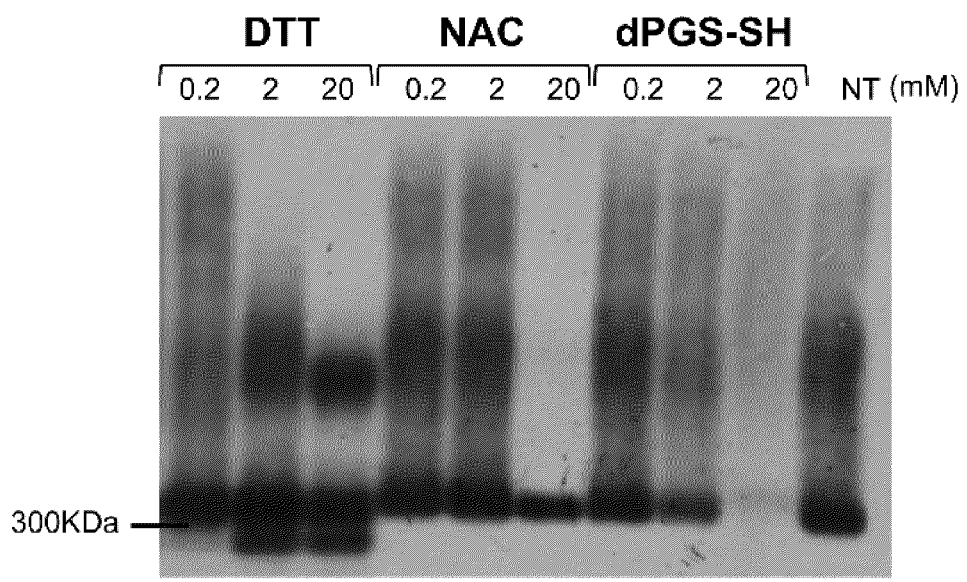
Figure 10D:
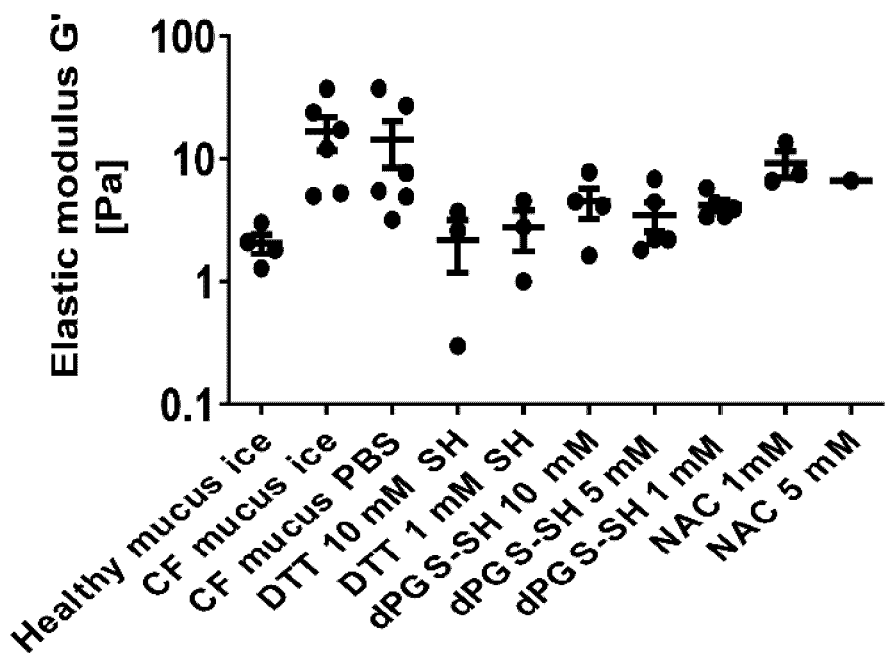

The four-step reaction scheme of this synthesis is depicted in FIG. 9. It will be briefly explained in the following. Notably, this synthesis is not limited to linear polyglycerol backbones but generally works with almost every hydroxyl functionalization, i.e. in particular also with dendritic polyglycerol backbones.

Step I: Cleavage of Bromine

The —Br residue on the backbone of compound (a) was cleaved by stirring the compound overnight in sodium methoxide (1M solution from 4.4 M solution, 200 µL)+ Methanol 18 mL+$H_2O$ 3 mL.

The resulting lPEEGE (b) was purified by a 1.5-days dialysis against acetone.

Step II: Mesylation

Compound (b) was thoroughly dried for the mesylation step and dissolved in dry dimethylformamide (DMF). 7.5 equivalents of trimethylamine were added to the solution under stirring. Afterwards, ensuring the temperature was maintained at 0° C. using an ice bath, 3 equivalents of mesyl chloride solution (MsCl) in dry DMF were added dropwise. The ice bath was removed and the reaction was allowed to carry on overnight.

After ensuring the pH was ~8-10 (triethanolamine (TEA) was optionally used for pH adjustment), the resulting compound (c) was then dialyzed against methanol for 2 days (3 changes per day). NMR analysis confirmed formation of compound (c).

Step III: Thiolation by Thiourea

To a solution of (c) in methanol and 1-propanol, 4 equivalents of thiourea were added. With a condenser (and some needles as outlet), the reaction mixture was heated up to 115° C., and continued overnight (~1.5 d). Analysis of the resulting compound (d) was carried out by CHNS analysis.

Step IV: Deprotection

Using 4 equivalents of sodium hydroxide, with water as solvent, compound (d) was refluxed under the same conditions overnight.

The pH of the resulting solution was brought to 5-6. To obtain the purified compound (e), dialysis was carried out against water for 2 days (3 changes).

Further Results Regarding the Effects of dPGS-SH on Mucus

FIGS. 10 A to 10 D show the results of studies on the effects of dPGS-SH on biochemical and rheological properties of mucus from mice with CF-like lung disease and patients with CF.

After synthesis of the polymer-based reducing agents (dPG-SH and dPGS-SH), redoxpotentials were determined using cyclic voltammetry and compared to that of DTT (FIG. 10 A). For this purpose, the compounds were measured at 5 mM thiol content in DMSO against a ferrocinium/ ferrocene reference electrode. At equimolar thiol concentrations the dPG(S)-SH systems demonstrated a higher redoxpotential than DTT.

In addition, the thiol concentration was determined with the Ellman's assay (using 5,5'-dithiobis-(2-nitrobenzoic acid) or DTNB as reagent) immediately after synthesis and 10 months later (FIG. 10 B). Upon storage as lyophilisate at 4° C. the thiol-content of dPGS-SH did not change significantly for a period of 10 months. Regarding the compound stability, this aspect is an important finding.

Following, the different reducing agents were tested in a mucolytical activity assay on mucus from mice with CF phenotype using a Western blot analysis (FIG. 10 C). The samples were incubated at 37° C. for 30 minutes and then quenched. Western blotting was performed to assess the mucolytic potency of the three different reducing agents. The results indicate that dPGS-SH was more active than the clinically approved NAC at 2 mM and at 20 mM. Beyond, by comparing the 20 mM lanes of DTT and NAC, different molecular weight distributions of proteins could be observed. This indicates the stability of specific disulfide bonds towards certain reducing agents in the mucin network.

Finally, the mucolytic activity was probed on mucus samples from CF patients (FIG. 10 D). The collected mucus was kept on ice or treated for 30 minutes at 37° C. with the indicated reducing agent or a buffer control. After the treatment, the samples were quenched with 50 mM iodoacetamide and put on ice until they underwent rheological measurements. Here, the storage modulus of human mucus could be decreased with all reducing agents. The reducing efficacy of dPGS-SH was lower than that of DTT, but higher than the clinically approved drug NAC at equimolar concentrations.

The invention claimed is:

1. A method of treatment of a human or animal patient in need thereof to achieve a reduction of the viscosity of mucus of the patient, the method comprising the following step:
   administering a polyglycerol derivative to the patient, the polyglycerol derivative having a linear or dendritic polyglycerol backbone and carrying at least one thiol group covalently bound to the polyglycerol backbone, wherein the polyglycerol derivative corresponds to the following general formula (I):

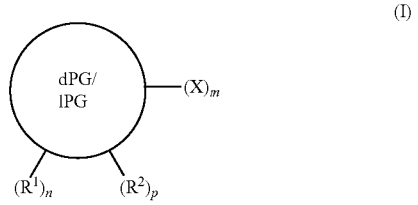

(I)

wherein
dPG denotes a dendritic polyglycerol backbone,
lPG denotes a linear polyglycerol backbone,
X is a residue chosen from the group consisting of:

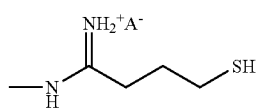

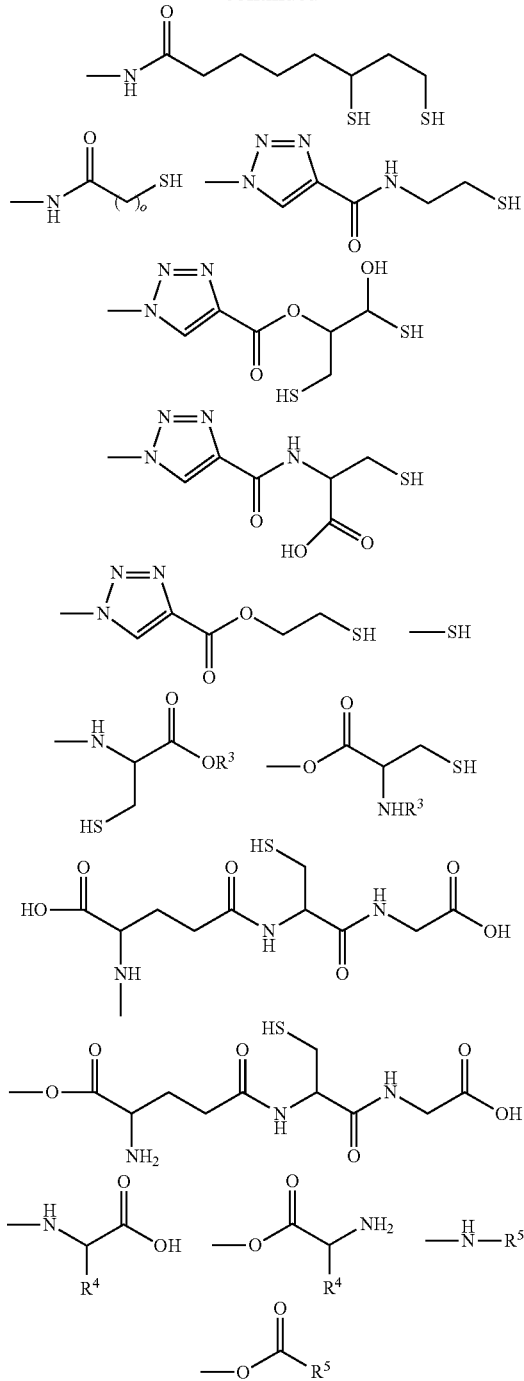

A is a single-charge anionic counter ion,
$R^1$, $R^2$ are independently from each other —OH or —OSO$_3^-$K$^+$,
$R^3$ is H or a peptide residue having 1 to 20 amino acid residues,
$R^4$ is a $C_1$-$C_{10}$ hydrocarbon chain being optionally interrupted by N, S, and/or O and being at least substituted in such a way to carry at least one thiol group,
$R^5$ is a peptidyl comprising 1 to 20 amino acid residues, wherein at least one amino acid residue is a cysteine residue, K is a single-charge cationic counter ion,
m is an integer between 1 and 20,
n is an integer between 5 and 5000,
o is an integer between 1 and 16, and
p is an integer between 0 and 5000.

2. The method of treatment of claim 1, wherein the human or animal patient is suffering from chronic sinusitis, asthma, chronic bronchitis, cystic fibrosis, chronic obstructive pulmonary disease, emphysema, bronchiectasis, chronic inflammatory bowel diseases, constipation, gastrointestinal malabsorption syndrome, irritable bowel syndrome, steatorrhea or diarrhea and being in need of such treatment.

3. The method of claim 2, wherein the polyglycerol backbone carries a plurality of sulfate groups, wherein a degree of sulfation of the polyglycerol backbone is between 10 and 100%.

4. The method of claim 2, wherein the polyglycerol backbone carries 1 to 100 thiol groups per polyglycerol derivative molecule.

5. The method of claim 2, wherein the polyglycerol backbone is biodegradable.

6. The method of claim 2, wherein the at least one thiol group is bound to the polyglycerol backbone via a linker.

7. The method of claim 1, wherein the polyglycerol backbone carries a plurality of sulfate groups, wherein a degree of sulfation of the polyglycerol backbone is between 10 and 100%.

8. The method of claim 1, wherein the polyglycerol backbone carries 1 to 100 thiol groups per polyglycerol derivative molecule.

9. The method of claim 1, wherein the polyglycerol backbone is biodegradable.

10. The method of claim 1, wherein the at least one thiol group is bound to the polyglycerol backbone via a linker.

* * * * *